A. G. AND C. GULBRANSEN.
PLAYER PIANO.
APPLICATION FILED AUG. 12, 1915.

1,308,736.

Patented July 1, 1919.
7 SHEETS—SHEET 1.

Fig.1

Inventors
Axel G. Gulbransen
Christian Gulbransen
By Brown, Hanson & Boettcher
Attys

A. G. AND C. GULBRANSEN.
PLAYER PIANO.
APPLICATION FILED AUG. 12, 1915.

1,308,736.

Patented July 1, 1919.
7 SHEETS—SHEET 2.

Fig. 2

Inventors
Axel G. Gulbransen
Christian Gulbransen
By Brown, Hanson & Boettcher
Att'ys

A. G. AND C. GULBRANSEN.
PLAYER PIANO.
APPLICATION FILED AUG. 12, 1915.

1,308,736.

Patented July 1, 1919.
7 SHEETS—SHEET 4.

Inventors
Axel G. Gulbransen
Christian Gulbransen
By Brown, Hanson & Booth
Att'ys

UNITED STATES PATENT OFFICE.

AXEL G. GULBRANSEN AND CHRISTIAN GULBRANSEN, OF CHICAGO, ILLINOIS, ASSIGNORS TO GULBRANSEN-DICKINSON COMPANY, OF CHICAGO, ILLINOIS, A CORPORATION OF ILLINOIS.

PLAYER-PIANO.

1,308,736.

Specification of Letters Patent.

Patented July 1, 1919.

Application filed August 12, 1915. Serial No. 45,091.

*To all whom it may concern:*

Be it known that we, AXEL G. GULBRANSEN and CHRISTIAN GULBRANSEN, both citizens of the United States, residing at Chicago, in the county of Cook and State of Illinois, have invented certain new and useful Improvements in Player-Pianos, of which the following is a full, clear, concise, and exact description, reference being had to the accompanying drawings, forming a part of this specification.

Our invention relates to player pianos and is particularly concerned with player pianos of the grand or square, that is, the horizontal-case, type. Although certain features of our invention may advantageously be employed in upright pianos, it will appear that the most important features thereof are particularly and peculiarly concerned with horizontal-case pianos, which I shall refer to broadly hereinafter as grand pianos.

It is the primary object of our invention to provide player mechanism for a grand piano, which player mechanism may be placed in either an operative or an inoperative condition, the latter condition being assumed when it is desired to play the piano manually.

We are concerned particularly with the arrangement and distribution of the player-mechanism parts relative to the piano itself, our object being to dispose the parts in such a manner as to make the conversion from one condition to the other a simple matter, to dispose the parts in the most advantageous position for playing, control and access, and to arrange the parts in such a way that their association with the piano will not detract from the artistic appearance of the instrument.

Although the features of our invention and the scope in which these features are original and novel with us are to be determined from the appended claims, we might say at the outset that we contemplate the subdivision of the player mechanism into three main parts: first, the roller box; second, the box lyre; and third, the action, which is secured directly underneath the bed of the piano. It is an important feature of our invention that the box lyre contains the entire power-plant. It is another important feature of our invention that the roller box carries not only the rollers and the usual tracker-board, but also the transmission and the motor for operating the rolls. These and other features of our invention will be brought out as this description proceeds and will be readily understood by reference to the accompanying drawings, which illustrate a player grand piano embodying the various features of our invention.

In these drawings,

Fig. 4 is a sectional view of a pedal-operating pneumatic which we shall refer to;

Fig. 7 is an under side view of the forward part of the piano, showing the roller box in playing position and having diagrammatically associated therewith a plan view of an expression device, which will be referred to;

Fig. 8 is a detail sectional view taken on the plane of the line 8—8 of Fig. 7 and looking in the direction indicated by the arrows;

Fig. 9 is an under side view of a certain tube arrangement, which will be referred to in detail later;

Figure 3:
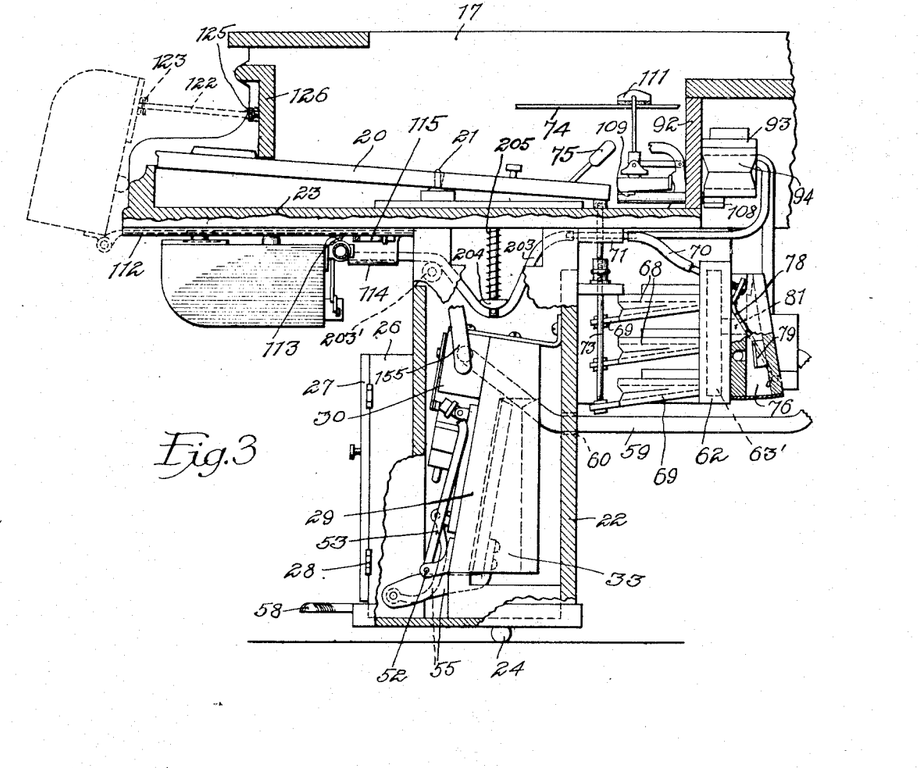
Fig. 3 is a cross-sectional view of the structure.

The piano casing is illustrated at 17, the legs at 18, and the top at 19. The keys 20, 20, form the keyboard, and, as shown in Fig. 3, are mounted upon the hinge-pins 21, in the usual way.

A box lyre 22 is secured to the under side of the bed 23 of the casing, in the position of the usual lyre on a grand piano. This box lyre is provided with casters 24 and the legs are provided with casters 25, 25, and upon all these casters the entire structure rests.

The box lyre 22 is provided with the forward extension 26, which is furnished with the doors 27, 27, hinged at 28, 28. A supporting-board 29 is firmly supported longitudinally and in an upright position within the box lyre 22, and this board carries at its top the wind-chest 30, and, below that, in mid-position, the two pumper-bellows 31, 31. To the left of the pumper-bellows an expansible reservoir 32 is provided, and to their right an expansible reservoir 33 is provided.

Our invention is not concerned with the interior details of these bellows and reservoirs, that being a matter of prior art, and a general description of their relation to each other will therefore suffice.

Figure 1:
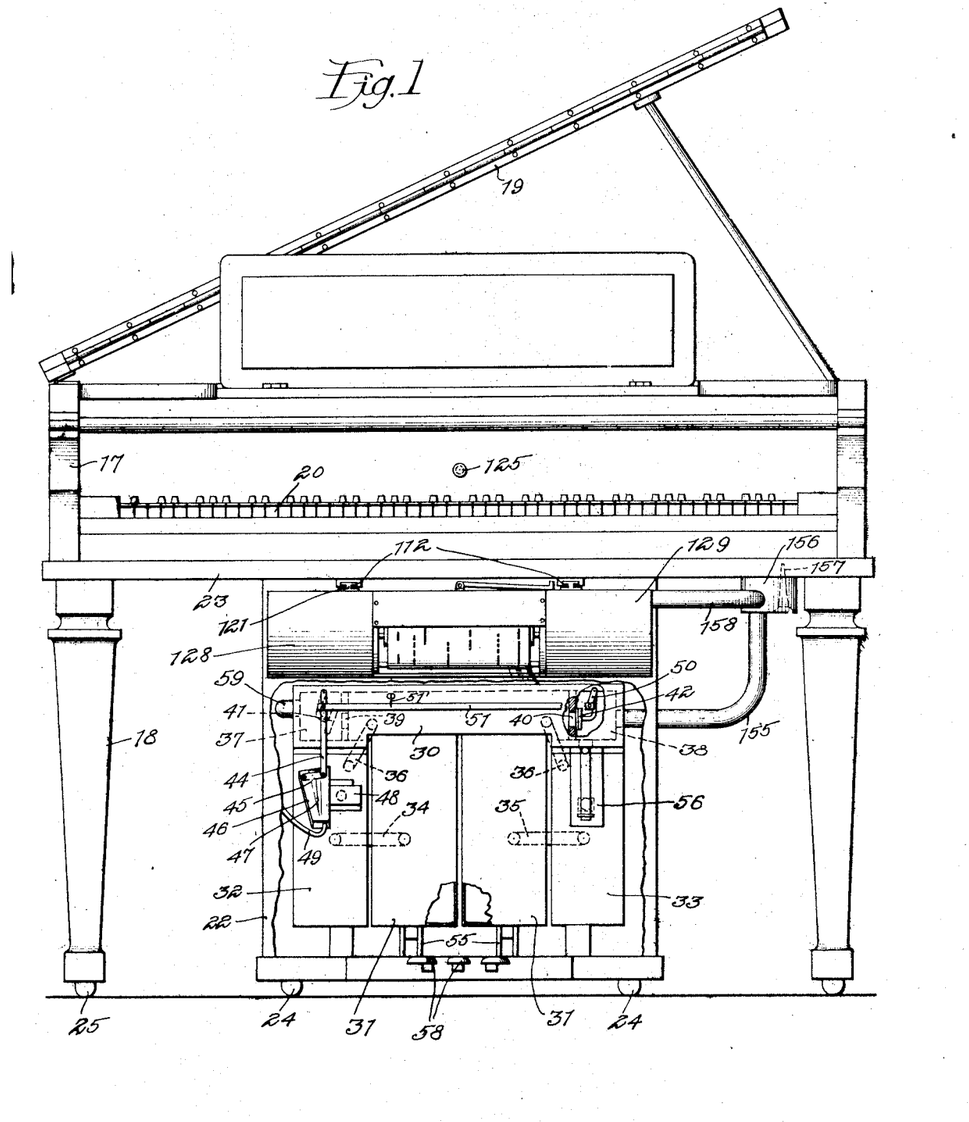
Figure 1 is a front elevational view of the player grand piano of our invention, in condition for manual playing, parts being broken away to reveal the interior construction.

The left-hand pumper-bellows 31 is connected with the reservoir 32 by means of a passageway 34, shown in dotted lines in Fig. 1, and the right-hand pumper-bellows 31 is connected with the reservoir 33 by means of the passageway 35. The reservoirs, which tend always to expand, transform the pulsations of the pumper-bellows into a steady pull. As indicated, the reservoirs 32 and 33 are connected with the wind-chest 30 by means of passageways 36, 36, so that a constant suction will be maintained within the wind-chest while the pumpers are in operation.

The wind-chest 30 is provided on one end with a valve-box 37, and at its other end with a valve-box 38. An opening 39 connects the wind-chest with the valve-box 37, and an opening 40 connects the wind-chest with the valve-box 38. Within the valve-box 37 a valve 41 is hingedly mounted, this valve being normally in open position, but being adapted to close the opening 39 in a manner to be described later.

Figure 4:
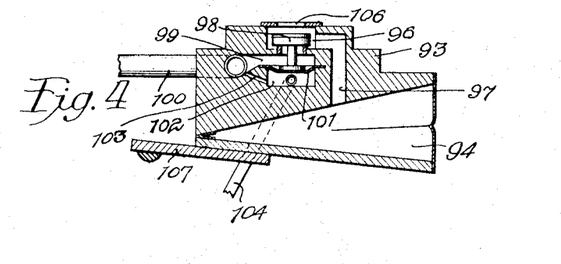

Within the valve-box 38 a valve 42 is hingedly mounted, this valve normally closing the opening 40 to confine the air to another path, but being adapted to be opened, in a manner to be described presently, in order to make the opening 40 fully effective. The pivot-pin upon which the valve 41 is mounted is provided upon the outside of the wind-chest, with a downwardly-extending lever 44, which, by means of a link 45 is connected with the movable board 46 of a pneumatic 47. The interior of this pneumatic is adapted to be connected with the interior of the reservoir 32 by means of a passageway in the block 48, this passageway being controlled by a primary valve operated by a diaphragm subject to the atmosphere, which may be made to enter by way of the tube 49, as will be described later. This primary valve and pneumatic structure are of standard construction and, although arranged differently, contain precisely the same elements as the primary valve and pneumatic structure illustrated in Fig. 4, which will be later described. In view of this similarity, and in view of the fact that Fig. 4 will be explained in detail, it will be needless to burden this specification with a recitation of the details of the primary valve and pneumatic structure under consideration. Suffice it to say that when atmosphere is allowed to enter the tube 49, the pneumatic 47 will be collapsed, the lever 44 will be swung to the right, and the valve 41 will close the passageway 39.

The pivot-pin upon which the valve 42 is mounted is provided upon the outside of the wind-chest with a downwardly-extending lever 50, which, by means of a connecting-link 51, is operatively joined with the link or lever 44. Thus, when the lever 44 is moved to the left, the lever 50 will also be moved toward the left into position maintained by the spring 51', and when the arrangement is moved to the right the valve 42 is opened, all for a purpose to be described later.

Figure 2:
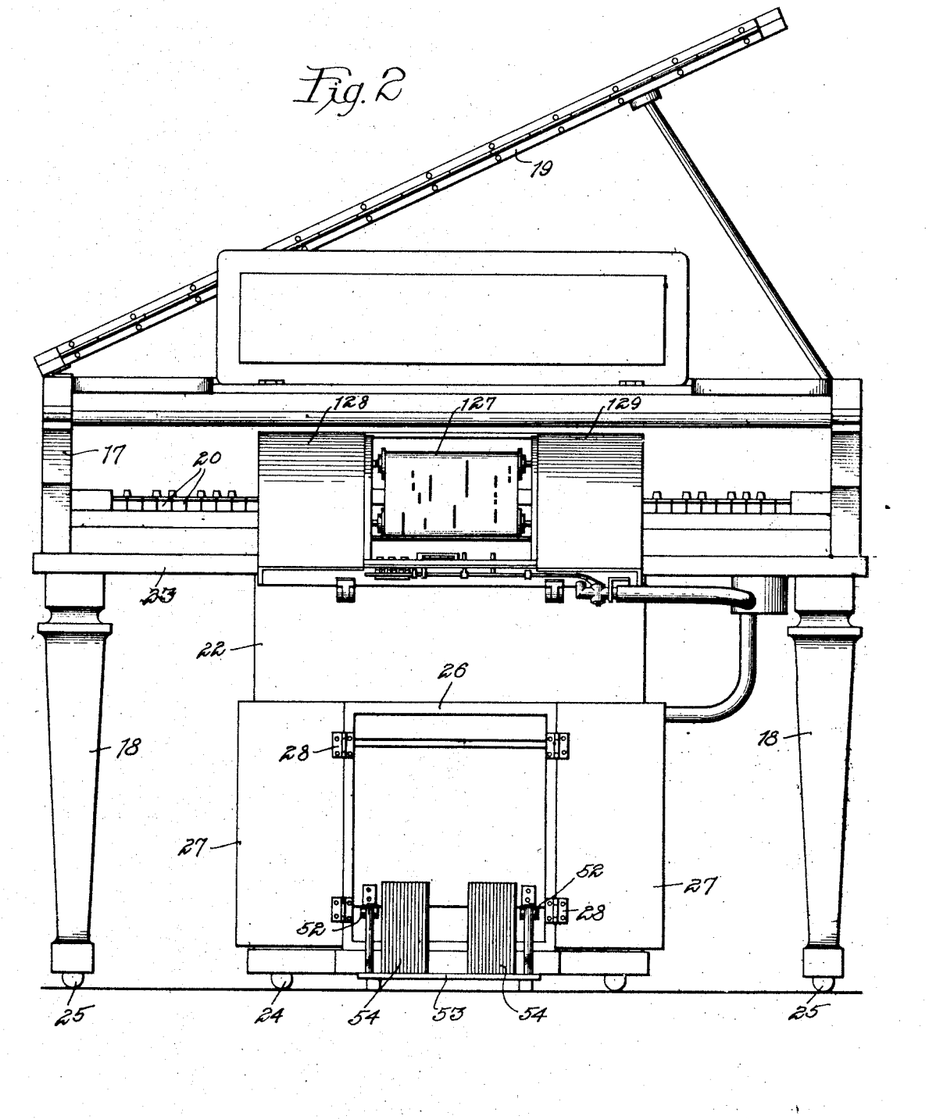
Fig. 2 is a view similar to Fig. 1 except that the player mechanism is shown in condition for operation.

By reference to Figs. 2 and 3 it will be seen that there is hinged at 52, 52, to the supporting-board 29, a frame 53, to which pedals 54, 54 are hinged and which, as illustrated in Figs. 2 and 3, may be moved to occupy an outer position resting upon the floor, with the doors 27, 27 open; or an inner position, swung upwardly against the board 29, with the doors closed. These pedals are operatively connected with the pumper-bellows by means of linkages 55, 55, and upon operation will operate the pumper-bellows to exhaust the air from the reservoirs which have been described.

A governor 56 is connected between the reservoir 33 and the valve-box 38, as shown in Fig. 1, for a purpose to be described presently.

The box lyre structure which has thus been described in no way interferes with the ordinary operation of the usual piano-pedals 58, 58.

Figure 5:
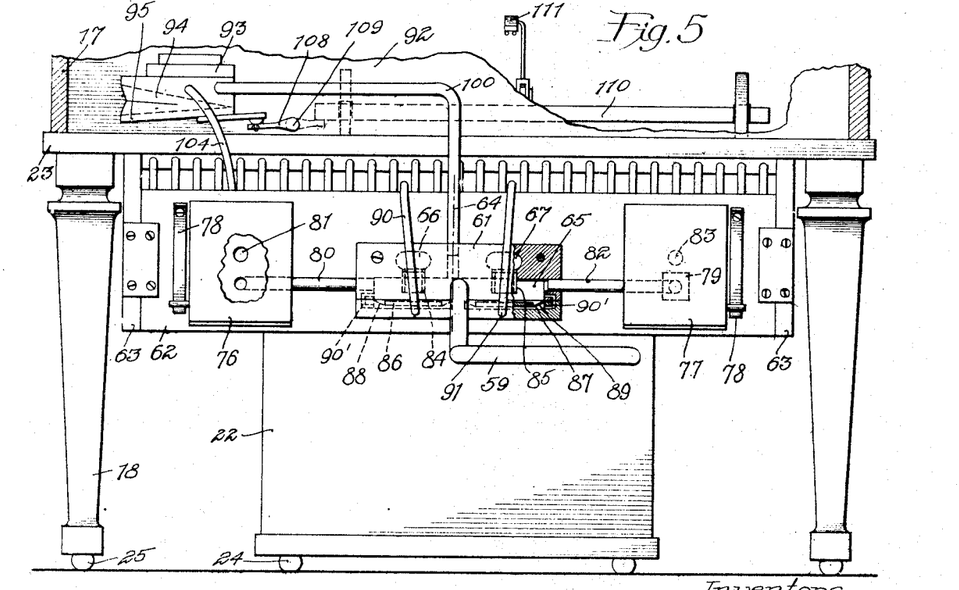
Fig. 5 is a rear elevational view of the structure, parts being broken away and shown in section to reveal the interior construction.

A suction-tube 59 leads from the valve-chamber 37, passes through an opening 60 in the back wall of the box lyre 22, and, as illustrated in Fig. 5, leads to the interior chamber of a control-box 61, secured to the back of the vacuum chamber board 62, which in turn, is supported between downwardly-extending supports 63, 63 on the under side of the piano-bed. The board 62 provides a vacuum chamber 63', which is divided into a treble portion and a bass portion by means of a partition 64, indicated in dotted lines in Fig. 5. The interior chamber 65 of the control-box 61, to which the suction-pipe 59 leads, is normally connected with both portions of the vacuum chamber by means of the ports 66 and 67. It will thus be seen that when the valve 41 is open suction will be maintained in both portions of the vacuum chamber.

Secured to the front face of the vacuum-chamber board 62 is a plurality of operating pneumatic units 68, 68, each comprising an operating pneumatic and a primary valve governing it. These operating pneumatics and valves are of standard construction and our invention is not concerned with their details. It is sufficient to point out that each of these unit structures is provided with a movable board 69, which rises when the corresponding pneumatic collapses, and that each of the controlling primary valves operates in response to the movement of a diaphragm subject to atmosphere entering by way of a tube 70. One of these pneumatic and valve units is provided for each of the piano notes to be played, and each of them is connected by means of a tube, as will be pointed out presently, with a tracker-board opening, as is well known in the art.

Figures 7, 8, 9:
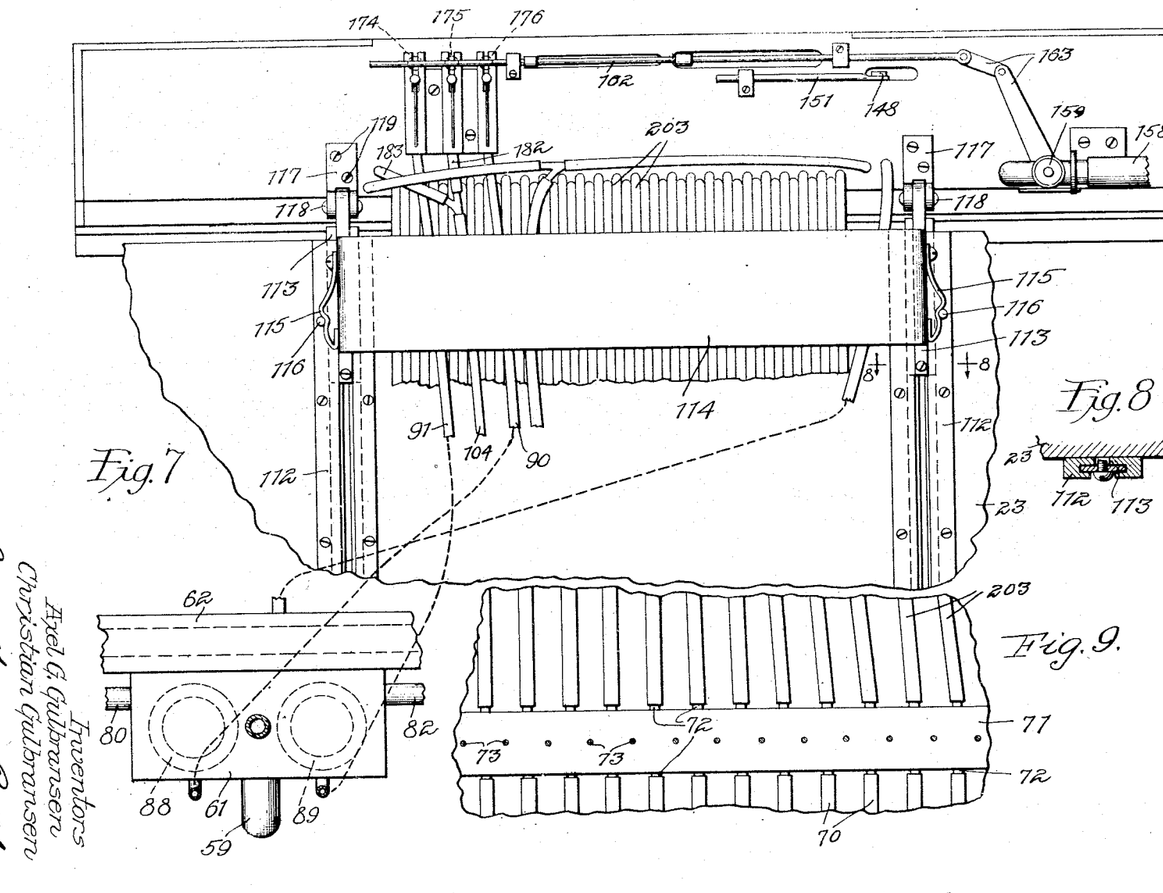

A block 71 is secured to the under side of the piano-bed 23, above the free ends of the movable boards of the operating pneumatics, and this block carries a plurality of metal tubes 72, as illustrated in Fig. 9, to one end of each of which the corresponding tube 70 is connected. The tubes which are connected to the other ends of these metal tubes will be referred to later.

Each of the movable boards 69 is provided with an upwardly-extending rod 73, which passes through the block 71 through the bed 23, and engages with the proper key 20.

It will now be seen that when any of the pneumatics is collapsed the corresponding rod will be raised, causing the rear arms of the keys 20 to rise correspondingly. This results in the striking of the string 74 by means of the hammer 75.

Secured to the rear of the vacuum-chamber board 62, near the ends thereof, are the choker pneumatics 76, 77. These two pneumatics are of similar construction and the description of one will suffice. The sectional view thereof is illustrated in Fig. 3. The pneumatic is kept normally distended by means of the spring 78, and the suction-passage leading thereto is controlled by a valve 79. The choker pneumatic 76 is connected with the chamber 65 of the control-box 61 by means of the suction-passage 80, and with the treble portion of the vacuum chamber by means of the port 81. The choker pneumatic 77 is connected with the chamber 65 by means of the suction-passageway 82, and with the bass portion of the vacuum chamber by means of the port 83. The ports 66 and 67, hereinbefore referred to, terminate in valve-seats 84 and 85, respectively, within the chamber 65. These valve-seats are controlled by valves 86 and 87, respectively, which are carried upon pneumatic diaphragms 88 and 89, respectively. The diaphragm chambers under these diaphragms are connected by means of tubes 90 and 91, respectively, with means for controlling access of the atmosphere, as will be described hereinafter.

It will now be seen that under normal conditions, with the valves 86 and 87 open, the ports 66 and 67 form low-resistance shunts around the respective choker pneumatics, and the suction as produced by the power-plant in the box lyre has its full force and effect within the vacuum chamber. If it is desired to soften the tone of the treble side, atmosphere is admitted to the tube 90, in a manner to be described hereinafter, and the valve 86 rises to close the port 66, thus causing all the suction to be transmitted through the choker pneumatic. In view of the operation of the valve 79, which comes down to close the suction-passageway 80 when a certain predetermined suction is attained, as determined by the strength of the spring 78, or to constantly restrict it, more or less, it will be clear that no more than a limited amount of suction can be transmitted to the corresponding portion of the vacuum chamber, and the notes in that portion of the scale will, therefore, be operated more delicately, corresponding to the reduced suction. When atmosphere has once more been cut off from the tube 90 the valve is opened because of the pressure of the bleeder 90', the suction may again be transmitted directly through the port 66 and the full force may be resumed. When atmosphere is admitted through the tube 91 the analogous effect takes place upon the bass side of the scale.

We shall now refer to the means which is provided for sustaining the tone. As illustrated in Figs. 3 and 5, the under backboard 92 of the piano casing has secured to the rear thereof an operating pneumatic structure, which is illustrated in detail in Fig. 4. This structure comprises a block 93, to the under side of which a pneumatic 94, having a movable board 95, is secured. This block also contains a valve-chamber 96, which is connected with the interior of the pneumatic by means of a passageway 97. The valve 98 in the valve-chamber controls the connection between the valve-chamber and a chamber 99 which, by means of a tube 100, is connected with the chamber 65 in the control-box 61 so as to be subject to suction. The valve 98 is connected with a diaphragm 101, which covers a diaphragm-chamber 102, normally kept exhausted of air by means of a bleeder passageway 103. A tube 104 leads from means hereinafter to be described, for controlling the admission of atmosphere to the tube, and goes to the diaphragm-chamber 102. Normally, the interior of the pneumatic 94 is connected with the atmosphere by way of the air-inlet 106 to the valve-chamber. This keeps the pneumatic distended. When, however, atmosphere is admitted through the tube 104, the sudden rush of air raises the diaphragm 101 and also the valve 98 to close off the connection between the passageway 97 and the atmosphere, and to establish connection between the passageway 97 and the suction-chamber 99. This collapses the pneumatic. The movable board 95 of the pneumatic 94 is provided with an extension 107, which, as shown in Fig. 5, coöperates with a lever 108, pivoted at 109 and engaging the under side of the bar 110. When the bar 110 is raised, that action effects the raising of the dampers 111 in precisely the same manner as the dampers are raised by the depression of the usual so-called "loud" pedal.

It will be seen from Fig. 5 that when the pneumatic 94 collapses the lever 108 is moved in a counter-clockwise direction and the bar 110 is raised in the required manner.

Figure 6:
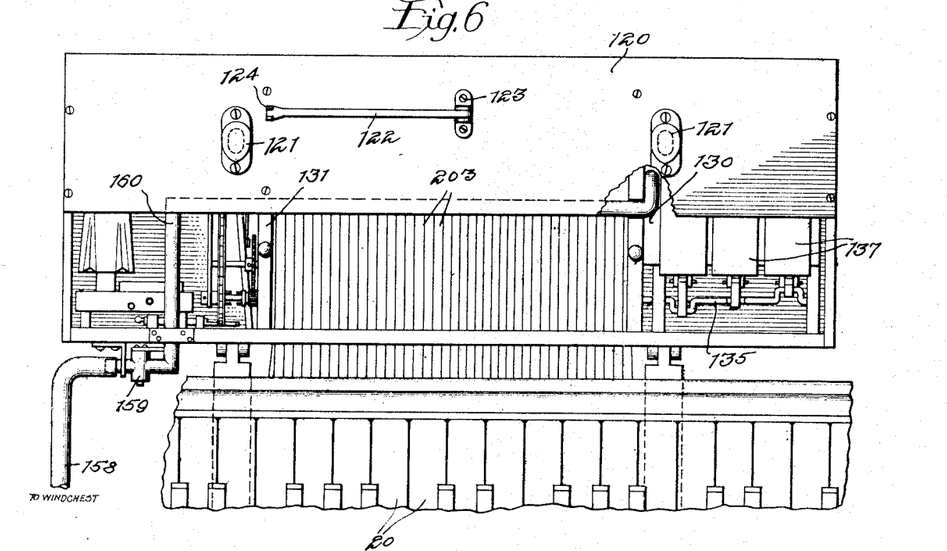
Fig. 6 is a plan view of the forward part of the piano, showing the roller box drawn out into an intermediate position.

We shall refer now to the roller-box mechanism. By reference to Figs. 3 and 7 it will be seen that on the under side of the bed 23 we provide a pair of slides 112, 112, which extend from the front of the casing back to the box lyre. A pair of supports 113, 113 is mounted to move rearwardly and forwardly in these slides, these supports being joined by means of a plate 114. At each end of the plate 114 a snap-spring 115 is provided, and each snap-spring coöperates with a pin 116, secured in the corresponding slide, when the supports are drawn outwardly to their outer position. To the outer end of each of the supports 113 a hinge member 117 is mounted upon a pivot-pin 118, and the roller-box structure is secured to these hinge members by means of the screws 119, 119. As illustrated in Fig. 3, when the playing mechanism is in inoperative condition the roller box occupies a horizontal position under the bed 23. As illustrated in Fig. 6, the backboard 120 of the roller box is provided with a pair of catches 121, 121, which, when the roller box is moved inwardly, take into the slides 112, 112 so as to support the roller box in the horizontal position shown, since the only other support is a hinged one. When it is desired to bring the roller box into operative position, it is withdrawn, still in horizontal position, into the position shown in Fig. 6, after which it is turned about upwardly into the position shown in dotted lines in Fig. 3. A bracket 122 is pivoted to a support 123, secured to the backboard 120, and the end of this bracket is provided with a claw 124, to engage a button 125 on the front board 126 of the piano casing, so as to hold the roller box in its upright position.

Figures 10, 11, 12, 13, 14:
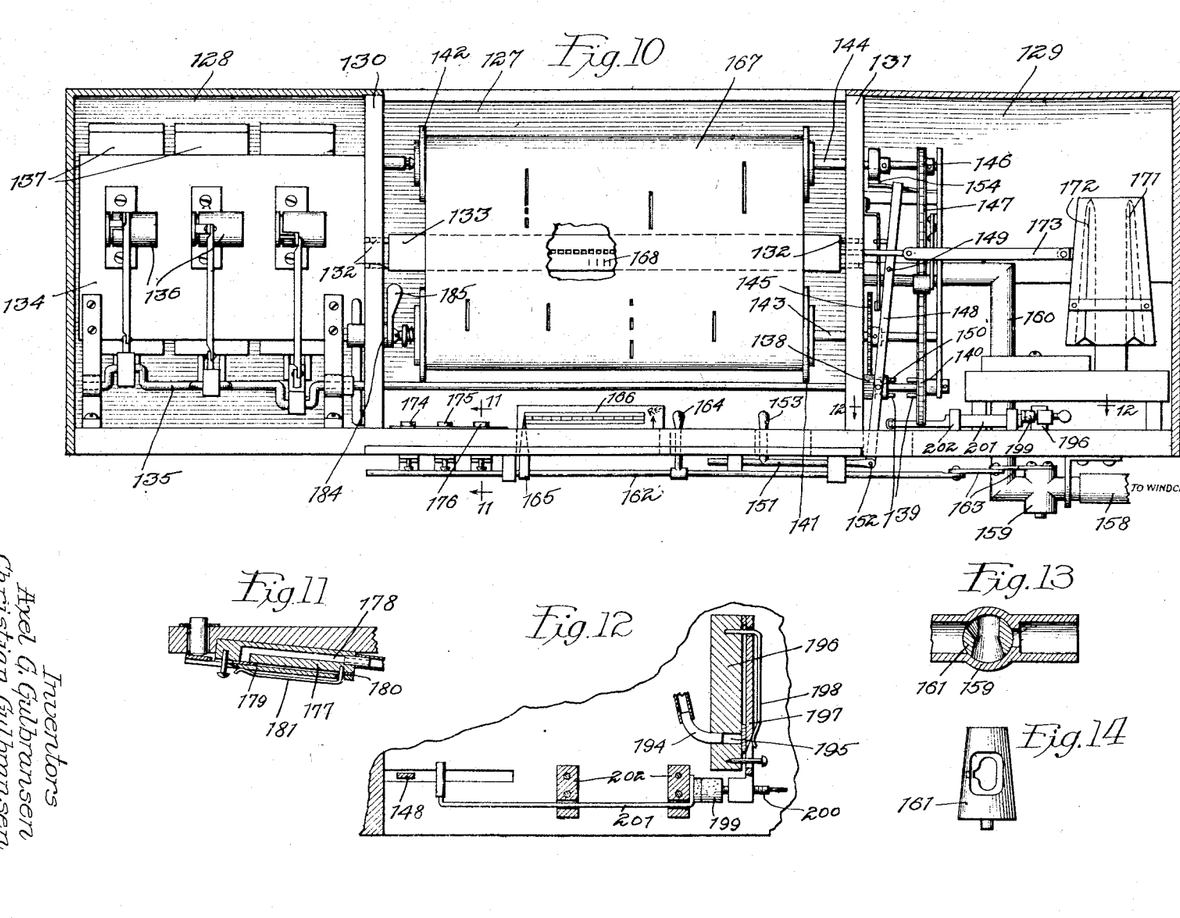
Fig. 10 is a front elevational view of the roller box, the front wall of the casing being removed so as to reveal the interior construction.
Fig. 11 is a detail sectional view taken on the plane of the line 11—11 of Fig. 10 and looking in the direction indicated by the arrows.
Fig. 12 is a sectional view taken on the plane of the line 12—12 of Fig. 10 and looking in the direction indicated by the arrows.
Figs. 13 and 14 are detail views of a valve which is employed and which will be referred to specifically later.

By reference to Figs. 1 and 2 it will be seen that the front of the roller-box structure presents an open central portion 127 and inclosed end portions 128, 129. Reference to Fig. 10, wherein the housings of the end portions have been removed, and to Fig. 6, will reveal the interior construction of the roller-box structure. It will be seen that the three portions which have been referred to are defined by the partitions 130 and 131, between which, by means of pins 132, 132, the tracker-board 133 is mounted. The air-motor, which comprises the backboard 134, the crank-shaft 135, the valves 136, and the bellows 137, is mounted in the end portion 128. The transmission is mounted in the end portion 129, and it will be seen that the crank-shaft 135 is extended through the central portion 127 and into the end portion 129, where it is provided with a pinion 138, a clutch 139, and a sprocket-wheel 140. The take-up roll 141 is mounted upon shafting set in the partitions 130 and 131, and the music-spool is adapted to be mounted upon shafting set in a similar manner. The music-spool is illustrated at 142, and the shafting for the take-up spool and the music-spool at 143 and 144, respectively. The shafting 143 is provided with a gear-wheel 145, which meshes with the pinion 138, and the shafting 144 is provided with a sprocket-wheel 146, which, by means of a chain 147, is operatively connected with the sprocket-wheel 140. By means of the clutch 139 the gear-connection may be completed or the sprocket-connection may be completed, for playing purposes and for rewinding purposes, respectively. The shifting of the clutch is secured by the movement of a lever 148, which is pivoted at 149 and which is connected with the clutch by means of a pin 150. A shifting-rod 151 is pivoted to the lever 148 at 152, and a finger-piece 153 extends from the shifting-rod 151 into the open portion of the roller-box structure, where it is immediately accessible to the operator. The lever 148 carries a drag 154, which is applied to the shafting 144 during the playing operation, and which is removed during the rewinding operation.

The operating medium, suction, is transmitted to the air-motor from the valve-box 38 (Fig. 1) by means of a flexible tube 155, which leads to a block 156, pivoted, at 157, to the under side of the bed 23. Also connected with this block 156, so that it may properly communicate with the flexible tube 155, is another flexible tube 158, which, as shown in Figs. 6 and 10, leads to a valve-member 159, this valve-member being connected by means of a pipe 160 directly with the air-motor. The valve-member 159, as shown in Figs. 13 and 14, contains a plug-valve 161 whereby the connection between the air-motor and the suction means may be controlled. A shifting rod 162 carried upon the under side of the roller-box structure, as clearly illustrated in Fig. 7, is connected by means of linkages 163 with the plug-valve 161, so that movement of the rod will result in angular movement of the valve. The rod 162 is provided with a finger-piece 164, which extends upwardly through a slot in the base of the roller-box structure, into the central portion thereof, so that, like the finger-piece 153, it will be readily accessible by the operator. This rod carries, also, the pointer 165, which coöperates with a scale 166 to show the tempo.

We have illustrated means for automatically maintaining the alinement of the note-sheet, indicated at 167, and the tracker-board 133. This automatic tracking-mechanism is not part of our present invention, and it is therefore sufficient to refer to it merely by reference to Figs. 10 and 15, where it will be seen that guide openings 168 and 169 in the tracker-board are closed and opened by the shifting of the note-sheet, so as to control primary valve-mechanism 170, which, in turn, controls the operation of the bellows 171, 172. Depending upon which of these bellows is collapsed, the tracker-board, by means of connecting linkages 173, is moved in one direction or the other to correct any misregister.

We come now to a consideration of the expression-mechanism. By reference to Fig. 10 it will be seen that in the base of the open portion of the roller-box structure we provide three expression buttons, 174, 175 and 176. These buttons control atmosphere-inlet-valves, of which the typical con-construction is illustrated in Fig. 11. It will be seen that a block 177 is secured to the under side of the roller-box structure, this block having a passageway 178 therein. A valve-member 179 normally closes this passageway 178, being hinged at 180, and a spring 181 maintains this normally-closed position. It will be seen, however, that when the button is depressed the valve 179 will be moved downwardly against the tension of the spring to admit air to the passageway 178. The button 174 controls the admission of air to the tube 91, and the button 176 controls the admission of air to the tube 90, these tubes 91 and 90 having hereinbefore been referred to as controlling the valves which in turn control the suction-passageways leading directly to the bass and treble portions, respectively, of the vacuum chamber. When the button 174 is depressed air is admitted to the tube 91, the port 67 is closed, and suction is transmitted to the bass portion of the vacuum chamber through the choker pneumatic 77. When the button 176 is depressed the air is admitted to the tube 90, the port 66 is closed, and the suction is transmitted to the vacuum chamber through the choker pneumatic 76, this being the treble portion of the vacuum chamber.

Figures 15, 16:
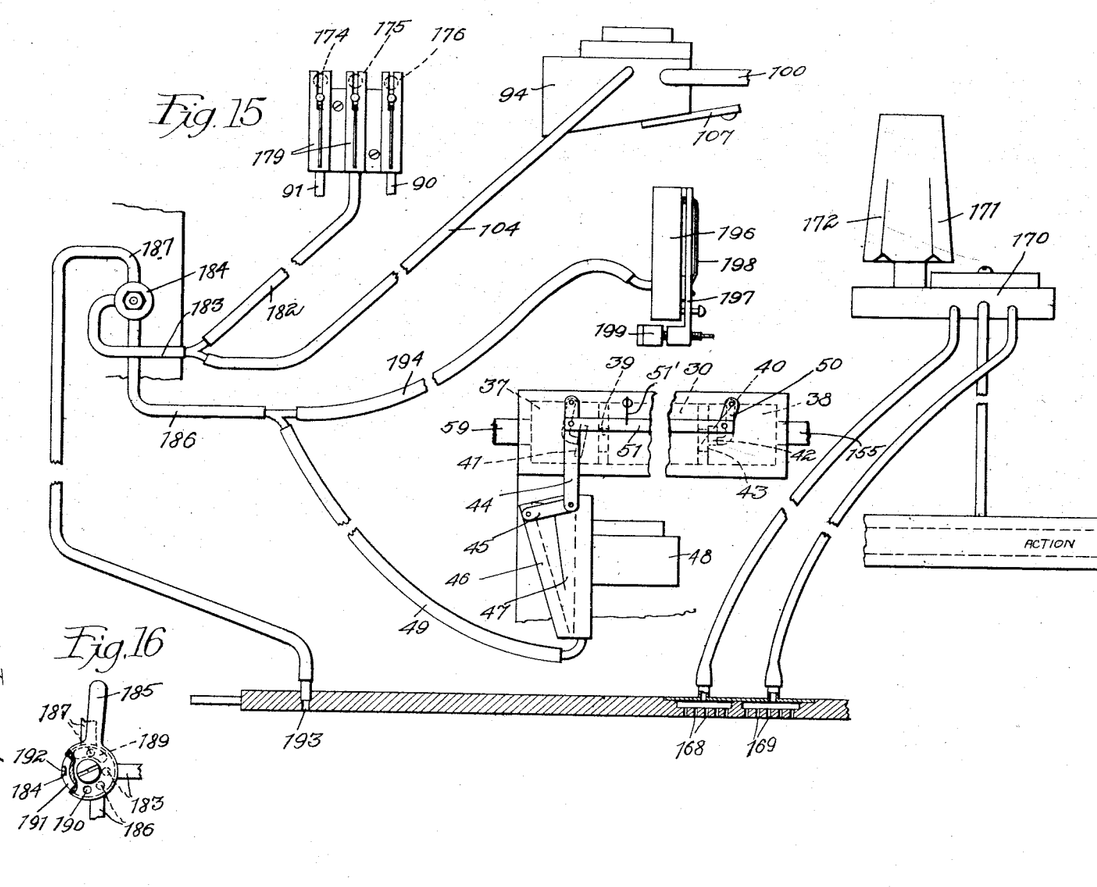
Fig. 15 is a diagrammatic illustration of part of the expression system.
Fig. 16 is a detail view of a valve, which will be referred to later.

The depression of the button 175 permits the admission of air to a tube 182, which, as shown in Fig. 15, leads to a tube 183 and also to the tube 104, this latter tube having hereinbefore been referred to. As has been described, the tube 104 leads to an operating pneumatic 94, illustrated broadly in Fig. 15 but shown more in detail in Fig. 4, as has been explained. When air is admitted to the tube 104 by the depression of the button 175, the operating pneumatic 94 collapses to raise the dampers 111. The connection of the tube 183 is provided in order to afford another means of operating the pneumatic 94. This latter means may be called the automatic sustainer. A valve 184, shown in detail in Fig. 16, is provided. This valve, as shown in Fig. 10, is mounted upon the partition 130, and the operating lever 185 thereof is made available to the operator in the open portion of the roller-box structure. The valve controls three passageways, 183, 186 and 187. The valve member 188 is provided with the connecting pocket 189, the atmosphere-port 190 and the stopnotch 191, this stopnotch coöperating with a pin 192 to limit the movement of the valve. When automatic sustaining is to take place, that is, sustaining controlled by the note-sheet, the valve is moved to that position where the pocket 189 will connect the passageways 183 and 187. The passageway 187 leads to an opening 193 in the tracker-board, and whenever this opening is uncovered, under these conditions, it will be seen that air will be admitted to the tube 104, with the results heretofore explained. In the mid-position no connections are made.

The opposite extreme position of the valve connects the passageway 186 with the atmosphere through the opening 193. In this condition it will be seen that air is admitted to the tube 49, which has been hereinbefore referred to. When air is admitted to this tube the operating pneumatic 47 is collapsed, the valve 41 is closed and the valve 42 is opened, as has hereinbefore been described. Therefore, under these conditions, we secure an operation which we term "silencing", that is, the omission of a portion of the piece of music being played. By the closing of the valve 41 the tube 59, which is the tube that leads from the suction to the action, is absolutely cut off from suction and the action remains inert. At the same time, the valve 42 is opened, so that the opening 40 shunts the governed passage between the reservoir 33 and the valve-chamber 38 and the motor is given its maximum speed during this interval. It will be seen by reference to Fig. 15, particularly, that a tube 194 also leads to the tube 49. As shown in Fig. 12, the tube 194 leads from a passageway 195 in a block 196, this block, as shown in Fig. 10, being mounted in the end portion 129 of the roller-box structure.

Referring now to Figs. 10 and 12, it will be seen that the passageway 195 is normally closed by a valve 197, engaged by a spring 198. The valve carries a bumper 199, adjustable by means of the screw-threads 200, and this bumper is adapted to be engaged by the end of a slide-rod 201, mounted in blocks 202. The slide-rod, on the other hand, is adapted to be engaged by the lever 148, which has hereinbefore been referred to. Since, upon rewinding, it is also desirable to close off the action and to exert the full force of the suction upon the air-motor, the act of rewinding is made to secure this desired effect. Thus, when the finger-piece 153, shown in Fig. 10, is moved to the right, the clutch is reversed and the lever 148 engages the rod 201 to open the valve and admit air to the tube 49. This, as before described, closes the valve 41 and opens the valve 42, to secure the desired effect. At the time the finger-piece 153 is moved to the right for rewinding purposes, the finger-piece 164 should also be moved to the extreme right, so that the valve 161 may be wide open under these conditions.

Referring back to the tracker-board, it will be seen that each of the player openings therein is connected, by means of a flexible tube 203, with a corresponding metallic tube 72 in the block 71, hereinbefore referred to. These tubes are provided with an ample amount of slack, so that, although the block 71 is stationary, the roller-box structure, which carries the tracker-board, may occupy its two positions. It will be seen from Fig. 3 that the front and back walls of the box lyre stop short of the top so as to leave openings for the entrance and exit of these tubes. Within the box lyre these tubes pass over a roller 203′, and they are kept taut and in proper place by means of a spring-pressed plunger 204 riding in the bed 23 and engaging the tops of the tubes. When the roller-box structure is drawn out, the spring 205 is depressed, in an obvious manner.

It will now be seen that the roller-box structure is an entirely separate entity except for air-line connections with the other parts of the mechanism. This is an important feature of our invention, since it simplifies the movement of the roller box and avoids the necessity of transmitting motion to the rolls in a complicated manner, such as by means of loose chains, etc., from a motor stationarily mounted. The inherent arrangement of the roller-box structure is important—the disposition of the motor on one side, with the transmission on the other, since this is all consistent with the fundamental idea of carrying the motor with the rollers, in an advantageous manner and with an equal distribution of parts. The disposition of the entire power-plant in the box lyre is also of importance. The box lyre houses the pedal-mechanism and also the bellows-mechanism, and the under structure of the piano is thereby greatly simplified. The arrangement permits the direct application of the action to the keys in a simple way and with ready accessibility. The pneumatic controls are of importance, since here again the finger-pieces therefor are naturally in the roller box and only the simple airline connections are required. In this connection we call special attention to the choker-mechanism in shunt of the direct passageways for transmitting suction to the vacuum chamber. The mounting of the roller box is also of importance, and the simplicity with which it is moved out of view and brought back into operative position is consistent with and a part of the other features which have been specially emphasized.

We claim:

1. In a player grand piano a case, a box lyre therefor, suction apparatus in said box lyre and an action operative by said suction apparatus lying outside of the piano case and back of the box lyre.

2. In a player grand piano, a case, a box lyre therefor, suction-producing means mounted in said box lyre, said suction-producing means comprising a wind-chest, pumper-bellows and reservoirs, and an action operated by said suction producing means outside said box lyre.

3. In a player grand piano, a case, a box lyre therefor, suction-producing means mounted in said box lyre, said suction-producing means comprising a wind-chest, pumper-bellows, reservoirs and control-mechanism, and an action operated by said suction producing means outside said box lyre.

4. In a player grand piano, a case, a box lyre therefor, suction-producing means mounted in said box lyre, said suction-producing means comprising a wind-chest, pumper-bellows and reservoirs, pedal-mechanism foldable into and out of said box lyre, and an action operated by said suction producing means outside said box lyre.

5. In a player grand piano, a case, a box lyre therefor, suction apparatus in said box lyre, pedal mechanism foldable into and out of said box lyre, and an action operated by said suction apparatus outside said box lyre.

6. In a player grand piano, a case, a box lyre therefor, suction apparatus in said box lyre, pedal mechanism foldable into and out of said box lyre, said box lyre having doors in the front thereof, and an action operated by said suction apparatus outside said box lyre.

7. In a player grand piano, a case, a box lyre therefor, suction apparatus in said box lyre, pedal-mechanism foldable into and out of said box lyre, said box lyre having a forward extension provided with doors in the front thereof, and an action operated by said suction apparatus outside said box lyre.

8. In a player grand piano, a case, a pivotally mounted roller-box structure capable of occupying two positions with relation to the piano case, music-rolls and a tracker mounted in said structure, a motor mounted exclusively on one side of said rolls, transmission-mechanism mounted exclusively on the other side of said rolls, and a shaft extending between said motor and said transmission-mechanism.

9. In a player piano, a case, a roller box mounted on a pivot upon said case, rollers in said box, a motor for operating said rollers also in said box, suction-producing means stationarily mounted relative to said base, a block pivoted to said case, a flexible conductor connecting said motor with said block, and a flexible conductor connecting said block with said suction-producing means, said conductors being connected in said block.

10. In a player piano, a pivotally mounted roller and tracker box adapted to occupy two positions, a stationarily-mounted action, flexible tubes connecting said tracker and action, and spring-pressed means engaging said tubes to hold them taut at all times.

11. In a player piano, a case, a roller and tracker-box mounted to slide underneath the bed of the keyboard and to be withdrawn and swung upwardly in front of the keyboard, and a connecting piece for connecting the box in its upright position to the front board of the case over the keys.

12. In a player piano, a frame, a structure movable relative thereto carrying music-rolls, a tracker, a motor for operating said rolls, reversing mechanism for said motor and a valve operated by said reversing mechanism, suction-producing means stationary relative to said frame, an action connected with said means, a flexible connection between said means and said motor, and valve-mechanism controlled by said first-named valve for cutting off the connection between said means and said action and enlarging the connection between said motor and said means.

13. In a player piano, a box lyre, suction producing mechanism in said box lyre, a pivotally mounted roller and tracker box adapted to occupy two positions, a stationarily mounted action, flexible tubes connecting said tracker and said action, said tubes passing through said box lyre and spring pressed means within said box lyre engaging said tubes to hold them taut at all times.

14. In a player grand piano, a piano case, a piano bed, a box lyre extending from the bed, suction bellows in the box lyre and a pneumatic action located back of the box lyre and outside the piano case.

15. In a player grand piano, a piano case, a piano bed, a box lyre extending from the bed, suction bellows and a main wind chest in the box lyre, a pneumatic action located back of the box lyre and a movable tracker box in front of the box lyre, said tracker box being supported from said piano bed.

16. In a player grand piano, a piano case, a piano bed, a box lyre extending from the bed, suction bellows in the box lyre, a pneumatic action located back of the box lyre and outside the piano case, a movable tracker box having associated mechanism lying in front of the box lyre and a pneumatic connection between the tracker box and the pneumatic action, said connection passing through the box lyre.

17. In a player grand piano, a piano case, a piano bed, a box lyre extending from the bed, suction bellows and a main wind chest in the box lyre, a pneumatic action located back of the box lyre, a movable tracker box having an associated mechanism lying in front of the box lyre and supported slidably upon the piano bed, and an extensible pneumatic connection between the tracker box and the pneumatic action, said connection passing through said box lyre.

18. In a player grand piano, a case, a box lyre having a suction producing device and a main wind chest therein, a pneumatic action outside the box lyre and a movable tracker box outside the piano case and connected to the pneumatic action.

19. In a player grand piano, a case, a box lyre, a suction bellows and a main wind chest in said box lyre, a pneumatic action outside the piano case and behind the lyre box and a slidable tracker box located below the keyboard and pneumatic connections leading through the lyre box.

20. In a player grand piano, a case, a box lyre therefor, a pair of vertical suction penumatics located centrally therein, a pair of suction reservoirs, one on each side of the suction pneumatics, a main wind chest located above the suction pneumatics, said main wind chest having direct connections with said reservoirs and having a pair of extensions forming a valve chamber at each end, valve ports connecting the extensions and the wind chest, a pair of valves governing said ports, a rod connecting said valves and an operating pneumatic connected to said rod, a governed passage connecting the adjacent suction reservoir with one of said extensions and means for controlling said operating pneumatic for closing one of said valve ports and opening the other.

21. In a player grand piano, a case, a box lyre having a pair of vertical suction pneumatics therein, a pair of suction reservoirs, one on each side of the suction pneumatics, a main wind chest above the suction pneumatics, said wind chest having connections with said reservoirs, and having a pair of extensions forming valve chambers, one of said valve chambers being connected to the pneumatic action and the other of said valve chambers being connected to the motor, valve ports connecting the extensions and the wind chest, a pair of valves governing said ports, a rod connecting said valve, an operating pneumatic connected to said rod, a governed passage connecting the adjacent reservoir with the one of said chambers which leads to the air motor, a manual valve element for controlling the operating pneumatics.

22. In a player grand piano, a case, a box lyre having a pair of vertical suction pneumatics therein, a pair of suction reservoirs, one on each side of the suction pneumatics, a main wind chest above the suction pneumatics, said wind chest having connections with said reservoirs, and having a pair of extensions forming valve chambers, one of said valve chambers being connected to the pneumatic action and the other of said valve chambers being connected to the motor, valve ports connecting the extensions and the wind chest, a pair of valves governing said ports, a rod connecting said valve, an operating pneumatic connected to said rod, a governed passage connecting the adjacent reservoir with the one of said chambers which leads to the air motor, a manual valve element for controlling the operating pneumatics, and means operable by the rewind control lever for controlling said operating pneumatics.

23. In a player grand piano, a piano case, a piano bed, a box lyre extending downward from the piano bed, pneumatic suction apparatus in the box lyre, a pair of brackets extending downwardly from the bed, back of the box lyre, a wind channel mounted between said brackets, and a pneumatic action supported on the wind channel, said action having an operating abstract extending through the piano bed.

24. In a player grand piano, a piano case, a piano bed, a box lyre extending downward from the piano bed, pneumatic suction apparatus in the box lyre, a pair of brackets extending downwardly from the bed, back of the box lyre, a wind channel mounted between said brackets, and a pneumatic action supported on the wind channel, said action having an operating abstract extending through the piano bed, a roller box comprising an operating motor pivotally and slidably supported on the lower side of the piano bed and pneumatic connection between the roller box and the pneumatic action, said connection passing through the box lyre.

In witness whereof we hereunto subscribe our names this 7th day of August, A. D. 1915.

AXEL G. GULBRANSEN.
CHRISTIAN GULBRANSEN.